United States Patent [19]
Swarovski

[11] Patent Number: 6,126,305
[45] Date of Patent: Oct. 3, 2000

[54] LIGHT FITTING

[75] Inventor: Daniel Swarovski, Wattens, Austria

[73] Assignee: D. Swarovski & Co., Wattens, Austria

[21] Appl. No.: 09/057,464

[22] Filed: Apr. 9, 1998

[30] Foreign Application Priority Data

Apr. 11, 1997 [AT] Austria .................................. 221/97 U

[51] Int. Cl.⁷ .................................. F21V 8/00; F21V 7/04
[52] U.S. Cl. .......................... 362/565; 362/806; 362/404; 362/336; 362/576
[58] Field of Search ..................................... 362/147, 404, 362/408, 554, 565, 581, 806, 558, 576, 308, 309, 336, 333

[56] References Cited

U.S. PATENT DOCUMENTS

| | | | |
|---|---|---|---|
| 3,536,908 | 10/1970 | Oster . | |
| 4,394,714 | 7/1983 | Rote | 362/554 |
| 5,116,009 | 5/1992 | Bayer . | |
| 5,303,125 | 4/1994 | Miller | 362/141 |
| 5,422,792 | 6/1995 | Neumann | 362/554 |
| 5,662,403 | 9/1997 | Akashi et al. | 362/558 |

FOREIGN PATENT DOCUMENTS

| | | |
|---|---|---|
| 292843 | 8/1971 | Austria . |
| 0 265 892 | 5/1988 | European Pat. Off. . |
| 2 716 954 | 9/1995 | France . |
| 22 37 379 | 2/1974 | Germany . |
| 35 17 852 | 11/1986 | Germany . |
| 195 36 440 | 4/1997 | Germany . |
| 2 274 159 | 7/1994 | United Kingdom . |
| 91/19934 | 12/1991 | WIPO . |
| 94/25795 | 11/1994 | WIPO . |

*Primary Examiner*—Thomas M. Sember
*Attorney, Agent, or Firm*—Wenderoth, Lind & Ponack, L.L.P.

[57] ABSTRACT

A light fitting, in particular a ceiling light fitting, has several reflective and/or refractive bodies, in particular facetted glass elements, which are lit by light guided via several optical fibers, wherein end areas of the optical fibers are held in at least one support. The reflective and/or refractive bodies are fastened individually or in groups to the support.

35 Claims, 2 Drawing Sheets

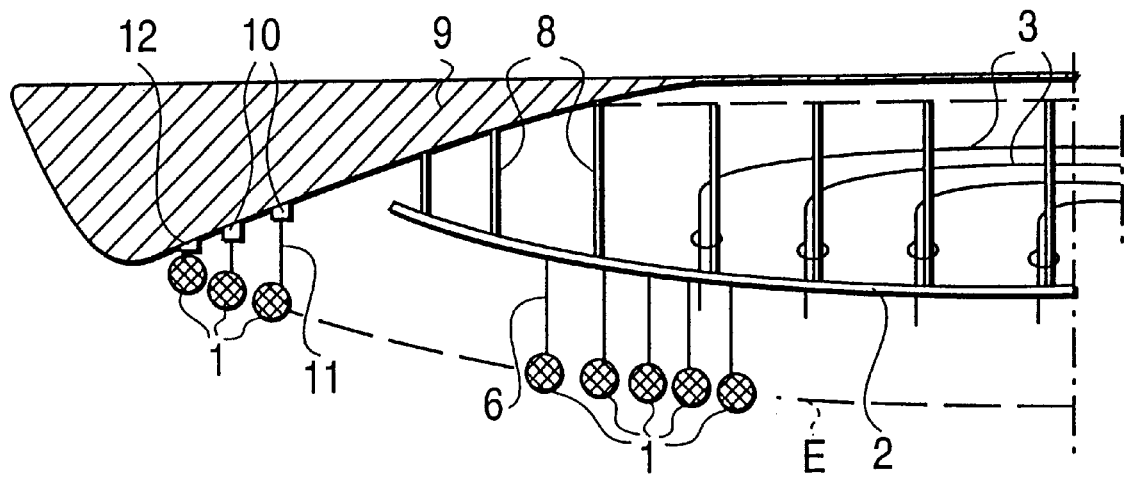
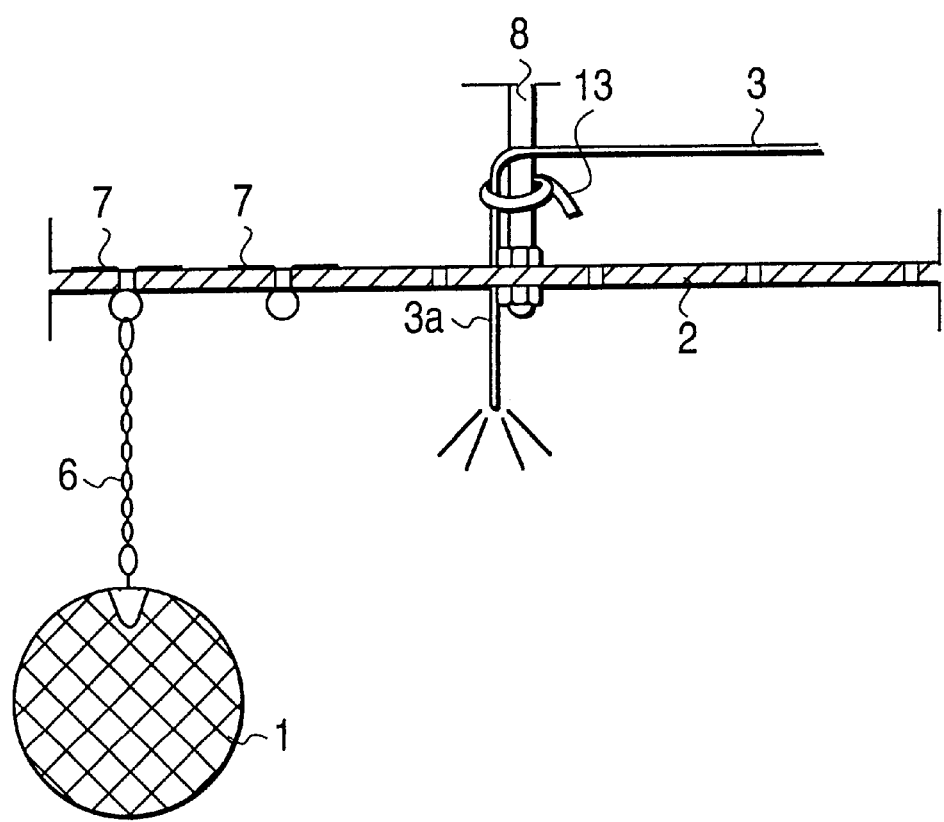

LIGHT FITTING

BACKGROUND OF THE INVENTION

The invention relates to a light fitting, in particular a ceiling light fitting, with several reflective and/or refractive bodies, in particular facetted glass elements which are lit by means of light guided by several optical fibres, wherein the end areas of the optical fibres are held in at least one support.

Such a light fitting is known from DE-A-195 36 400. In such arrangement, a chandelier hanging from the ceiling is illuminated with light originating from optical fibres distributed over the ceiling which terminate in the ceiling area.

SUMMARY OF THE INVENTION

In order to achieve a defined distribution of light and a homogeneous area of light emergence, it is provided according to the invention that the reflective and/or refractive bodies are fastened individually or in groups respectively to the support.

Such individual fastening or fastening in small groups of a few glass elements allows them to be arranged adjacently to one another over a relatively large area, for example in an imagined plane or an imagined slightly curved surface, and to specifically illuminate the side facing the viewer by means of a large number of optical fibres. It is possible, in particular, to produce a single layer of adjacent reflective and refractive bodies which provides a homogeneous appearance externally and nevertheless has high brilliancy. Moreover, the suspension in accordance with the invention of the reflective and/or refractive bodies allows a configuration of the light fitting, in particular of ceiling light fittings, with little height, such that it can also be used in rooms with a normal ceiling height.

It is particularly advantageous when at least some of the reflective and/or refractive bodies are fastened individually by means of separate fastening devices to the support, preferably at a distance therefrom. In principle, different fastening devices can be used, for example cables, wires, chains, retaining clamps or holders made from rigid material. A variety of these fastening devices can also advantageously be used with one and the same light fitting. In principle, there is also the possibility of sticking the reflective and/or refractive light conducting bodies to the support. However, holders which allow a distance or space between the support and the bodies appear to be more advantageous, as the optical fibres can then terminate in the space between the bodies and the support and consequently illuminate the bodies on the side facing the viewer. In practice, the light then escapes from the light fitting through the bodies, or between the bodies.

BRIEF DESCRIPTION OF THE DRAWING

Further advantages and details of the invention will be explained in more detail with reference to the following drawings.

FIG. 3 shows a schematic cross-section through a further embodiment of a light fitting according to the invention, wherein only the left-hand half of the light fitting is shown.

FIG. 4 shows a detail of a suspension of the light fitting shown in FIG. 3.

DETAILED DESCRIPTION OF THE INVENTION

Figure 1:
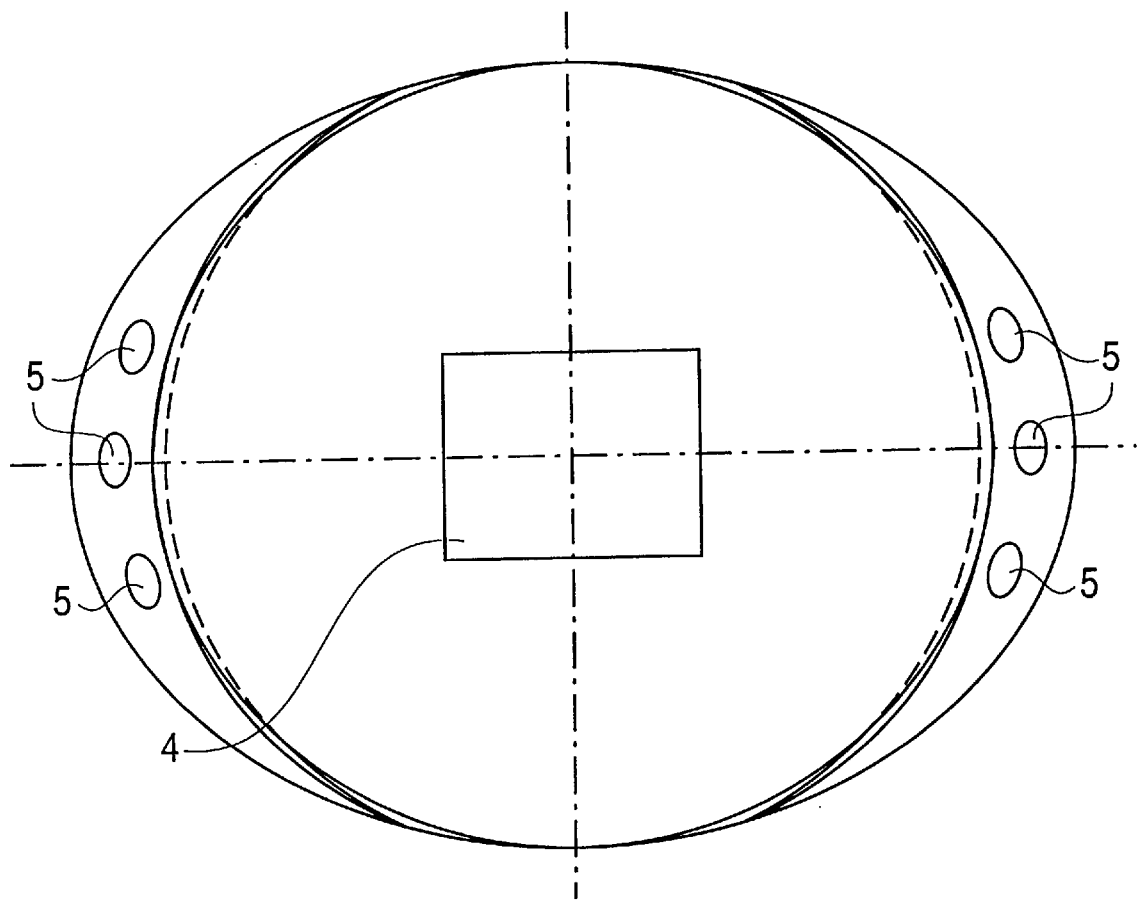
FIG. 1 shows a first embodiment in a schematic view from below with a support removed.
Figure 2:
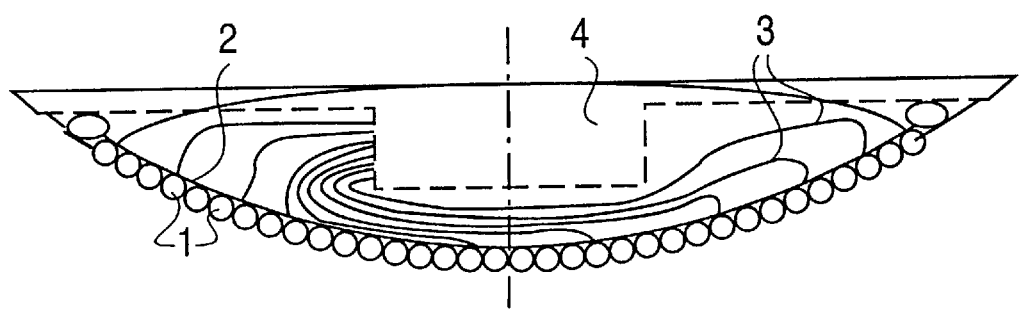
FIG. 2 is a schematic cross section thereof.

The light fitting shown in FIGS. 1 and 2 is provided with several transparent bodies or reflective and/or refractive bodies 1, in the present case facetted glass elements, as are used for example in chandeliers. These reflective and/or refractive bodies are fastened to a support 2, for example by sticking. Illumination takes place by means of optical fibres 3, into which light is fed by means of a light source unit 4. This can, for example, be provided with a halogen lamp and a reflector in a construction known per se. The optical fibres can in particular be glass fibres. According to the invention, the glass elements 1 are connected individually to the support 2, which can, for example, be a perforated plate. In this way they can be arranged in a single layer along a curved surface, and be specifically illuminated by optical fibres 3 on the side facing the viewer, wherein it is to be noted that in FIG. 2 a number are shown only schematically, and in practice, the number of optical fibres can be considerably greater. It appears advantageous with standard ceiling lights to have 50, preferably over 100 optical fibres, in order to achieve a generally homogeneous light distribution. The number of reflective and/or refractive bodies 1 is typically over 100, preferably even over 500, wherein the ratio between the number of bodies to the number of optical fibres is advantageously between 3:1 and 10:1, preferably between 6:1 and 7:1. In this way using an optical fibre, a clearly defined number of bodies (glass elements) can be illuminated specifically and thereby a well defined light distribution achieved.

For room lighting specifically, the light fitting according to FIGS. 1 and 2 can be provided with additional light sources 5, in particular halogen lamps with cold-light reflectors.

A preferred embodiment is shown in FIGS. 3 and 4. In this embodiment the main support 2 is composed of a perforated plate through which the end areas 3a of the optical fibres 3 are guided, only some of which are shown. In addition, this same perforated plate serves as a support for individual fastening of the reflective and/or refractive bodies 1 (for example facetted glass elements, in particular made from crystal glass, chandelier drops or other ornamental bodies). Only some of the bodies 1 are shown by way of an example. They are distributed in a substantially surface covering manner over the surface E.

It has been shown that in practice a perforation distance of between 2 and 10 mm, preferably between 3 and 5 mm for the holes in the perforated plate 2, which is advantageously made from aluminium, is most advantageous. The perforation distance is advantageously 3 to 10 times smaller than the distance apart of the bodies 1. This allows the position of the ends of the optical fibres to be aligned directly opposite the bodies 1. In particular, it is possible to increase the surface density of the optical fibres where coloured bodies are arranged in order to increase the illumination density there, on the one hand to create special colour accents and on the other hand to compensate for the higher absorbtion in the bodies 1 caused by the colours.

The optical fibres terminate in an exposed manner in the embodiment shown in FIGS. 3 and 4 and are preferably polished, that is to say there is no need to use special emergence lenses. It is additionally advantageous for high brilliancy of illumination that the lighting comes from exposed optical fibre ends. As FIG. 3 shows, the optical fibres terminate in the space between the support 2 and the reflective and/or refractive bodies 1, so they illuminate the side facing the viewer from behind such that the light emerges through these bodies or between these bodies. The ends of the optical fibres 3 can also lie just by the support 2.

The bodies 1 are fastened to the support 2 by means of chains 6 and split pins 7 such that a single layer of adjacent (here preferably identical) bodies is produced. Suspension by means of chains 6 is simple and allows a distance or spacing between the bodies 1 and the support 2, wherein the optical fibres 3 can terminate in the space in between.

At least some of the optical fibres 3 are fastened to spacers 8, by means of which the support 2 is connected to a base body 9 of the light fitting. The light source unit 4, which is not shown in FIG. 3 for reasons of clarity, can be housed in the space between the base body 9 and the support 2. Such space or gap additionally allows the optical fibres 3 to be guided.

In the embodiment shown, the base body itself also still serves as a support for the outermost rows of glass bodies 1, wherein these can be fastened either on rails 10 by means of clamps 11 or by means of a rigid holder 12. In this area the type of fastening is other than by means of the chains 6 used in the large central area on the support 2. This difference is clearly not recognisable to the viewer. The holder 12 can, for example, be configured such that the glass piece 1 is stuck onto it and the holder itself is screwed onto the base body 9 or support.

The invention is naturally not limited to the embodiments shown, for example, instead of being fastened by cable connectors 13 to the spacers 8, the optical fibres can be directly fastened into the holes of the perforated plate 3, for example by sticking or by using special inserts. The number and shape of the reflective and/or refractive bodies used can also differ from the substantially spherical shape shown. Although individual fastening of the bodies to the support 2 is preferred, in principle it can also be provided that smaller groups of bodies, for example with a maximum of 10 pieces can be fastened by means of a common holder to the support 2. In any case, it is however advantageous when a planar arrangement of the bodies in one layer (or at the most a few lying on top of another) is produced.

What is claimed is:

1. A light fitting comprising:
   at least one support;
   a plurality of transparent bodies in the form of faceted glass elements
   a plurality of fastening devices mounted on said at least one support and suspending said transparent bodies below said at least one support; and
   a plurality of optical fibers lighting said transparent bodies, said optical fibers having respective end areas held in said at least one support.

2. A light fitting as claimed in claim 1, wherein at least some of said fastening devices comprise retaining clamps.

3. A light fitting as claimed in claim 1, wherein at least some of said fastening devices comprise holders made from rigid material, each said holder being connected to said support and to a respective said transparent body.

4. A light fitting as claimed in claim 1, wherein each said transparent body is suspended individually from said at least one support by a respective said fastening device.

5. A light fitting as claimed in claim 1, wherein said transparent bodies are arranged in groups, and each said group of transparent bodies is suspended from said at least one support by a respective said fastening device.

6. A light fitting as claimed in claim 1, wherein at least some of said transparent bodies are fastened directly to said at least one support.

7. A light fitting as claimed in claim 1, wherein said transparent bodies are both reflective and refractive.

8. A light fitting as claimed in claim 1, wherein said plurality of transparent bodies are fastened to said at least one support by different types of fastening or different types of said fastening devices.

9. A light fitting as claimed in claim 1, wherein a first plurality of said transparent bodies are suspended individually from said at least one support by respective said fastening devices, and a second plurality of said transparent bodies are arranged in groups, each said group being suspended from said at least one support by another respective said fastening device.

10. A light fitting as claimed in claim 1, wherein said plurality of optical fibers comprises more than fifty optical fibers.

11. A light fitting as claimed in claim 10, wherein said plurality of optical fibers comprises more than one hundred optical fibers.

12. A light fitting as claimed in claim 1, wherein said plurality of transparent bodies comprises more than one hundred transparent bodies.

13. A light fitting as claimed in claim 12, wherein said plurality of transparent bodies comprise more than five hundred transparent bodies.

14. A light fitting as claimed in claim 1, wherein a ratio between the number of said plurality of transparent bodies and the number of said plurality of optical fibers is between 3:1 and 10:1.

15. A light fitting as claimed in claim 1, wherein said at least one support comprises a perforated plate having therein holes, each said optical fiber has an end area guided through a respective said hole, and at least some of said transparent bodies are suspended from said perforated plate by at least some of said fastening devices that also engage in respective said holes.

16. A light fitting as claimed in claim 15, wherein said plate is curved.

17. A light fitting as claimed in claim 15, wherein a spacing between adjacent said holes is between 2 mm and 10 mm.

18. A light fitting as claimed in claim 17, wherein said spacing is 1/10 to 1/3 of a distance between adjacent said transparent bodies.

19. A light fitting as claimed in claim 1, further comprising a base body, said at least one support being mounted on said base body.

20. A light fitting as claimed in claim 19, wherein a space is provided between said base body and said at least one support, and further comprising a light source positioned in said space and supplying light to said optical fibers.

21. A light fitting as claimed in claim 20, further comprising spacers in said space and supporting at least some of said optical fibers.

22. A light fitting as claimed in claim 1, wherein all of said transparent bodies have the same configuration.

23. A light fitting as claimed in claim 1, wherein at least some of said transparent bodies have different colors.

24. A light fitting as claimed in claim 1, wherein the number of ends of said optical fibers varies over the area of said at least one support.

25. A light fitting as claimed in claim 24, wherein the number of ends of said optical fibers is increased at an area wherein said transparent bodies are colored.

26. A light fitting as claimed in claim 1, wherein ends of said optical fibers are exposed.

27. A light fitting as claimed in claim 26, wherein said exposed ends are spaced from said at least one support and are located between said at least one support and said transparent bodies.

28. A light fitting as claimed in claim 1, wherein said transparent bodies are arranged in an imaginary plane or an imaginary curved surface.

29. A light fitting as claimed in claim 28, wherein said transparent bodies are spaced from said at least one support by a substantially constant distance.

30. A light fitting as claimed in claim 1, further comprising a light source to supply light to said optical fibers, and a further light source providing direct light and light via a reflector.

31. A light fitting as claimed in claim 1, wherein said light fitting comprises a ceiling light fitting configured to be mounted on a ceiling.

32. A light fitting comprising:

at least one support;

a plurality of transparent bodies, a plurality of fastening devices including cables mounted on said at least one support and suspending said transparent bodies below said at least one support; and a plurality of optical fibers lighting said transparent bodies, said optical fibers having respective end areas held in said at least one support.

33. A light fitting comprising:

at least one support;

a plurality of transparent bodies, a plurality of fastening devices including wires mounted on said at least one support and suspending said transparent bodies below said at least one support; and a plurality of optical fibers lighting said transparent bodies, said optical fibers having respective end areas held in said at least one support.

34. A light fitting comprising:

at least one support;

a plurality of transparent bodies;

a plurality of fastening devices including chains mounted on said at least one support and suspending said transparent bodies below said at least one support; and a plurality of optical fibers lighting said transparent bodies, said optical fibers having respective end areas held in said at least one support.

35. A light fitting comprising:

at least one support;

a plurality of transparent bodies;

a plurality of fastening devices mounted on said at least one support and suspending said transparent bodies below said at least one support;

a plurality of optical fibers lighting said transparent bodies, said optical fibers having respective end areas held in said at least one support; and at least some of said transparent bodies being arranged in groups, each said group of transparent bodies being suspended from said at least one support by a respective said fastening device, and each said respective device including cable.

* * * * *